US011907727B2

(12) United States Patent
Wilson et al.

(10) Patent No.: US 11,907,727 B2
(45) Date of Patent: Feb. 20, 2024

(54) METHOD AND SYSTEM FOR DETERMINING STACKABLE SYSTEM ROLES FOR INFORMATION HANDLING SYSTEMS BASED ON COLLECTIVE NEED

(71) Applicant: Dell Products L.P., Round Rock, TX (US)

(72) Inventors: Lucas Avery Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 17/488,746

(22) Filed: Sep. 29, 2021

(65) Prior Publication Data

US 2023/0095176 A1    Mar. 30, 2023

(51) Int. Cl.
*G06F 9/44* (2018.01)
*G06F 9/4401* (2018.01)

(52) U.S. Cl.
CPC ................... *G06F 9/4401* (2013.01)

(58) Field of Classification Search
None
See application file for complete search history.

(56) References Cited

U.S. PATENT DOCUMENTS

| | | | |
|---|---|---|---|
| 2011/0302573 A1* | 12/2011 | Bubolz | G06F 15/177 717/173 |
| 2016/0277235 A1* | 9/2016 | Bhesania | H04L 41/0803 |
| 2021/0019131 A1* | 1/2021 | Tulsian | H04L 41/24 |
| 2021/0084048 A1* | 3/2021 | Kannan | H04L 63/104 |
| 2022/0167187 A1* | 5/2022 | Jia | H04L 43/065 |

* cited by examiner

*Primary Examiner* — Fahmida Rahman
(74) *Attorney, Agent, or Firm* — Chamberlain, Hrdlicka, White, Williams & Aughtry; Aly Z. Dossa

(57) ABSTRACT

A method for managing information handling systems includes obtaining, by an information handling system dictator, a stackable system role (SSR) entry from an information handling system, in response to the obtaining, performing a ratio-based bucket analysis using a set of SSR buckets to obtain a determined SSR for the IHS, wherein each of the SSR buckets corresponds to a unique SSR, updating the SSR entry based on the determined SSR to obtain an updated SSR entry, and providing the updated SSR entry to a SSR manager of the information handling system.

8 Claims, 11 Drawing Sheets

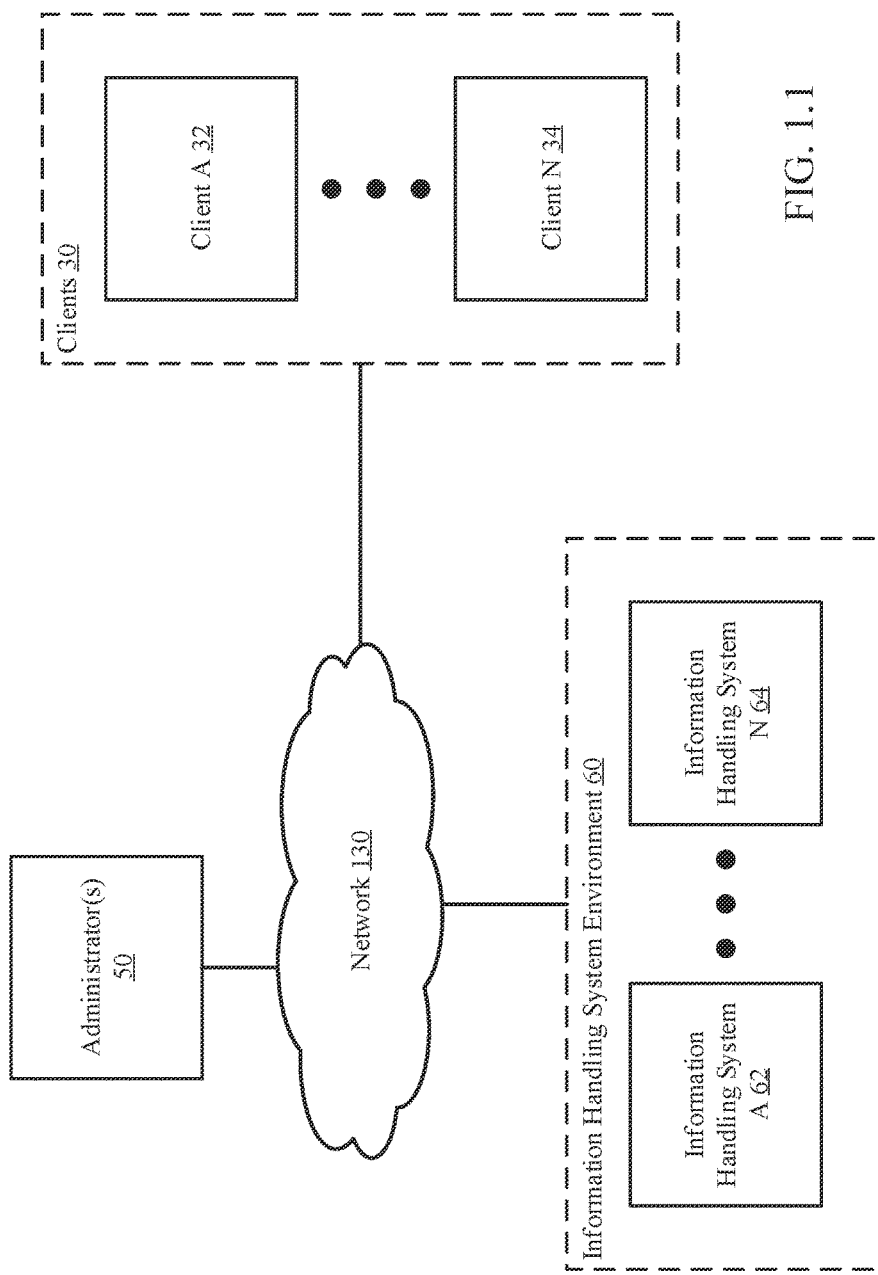
FIG. 1.1

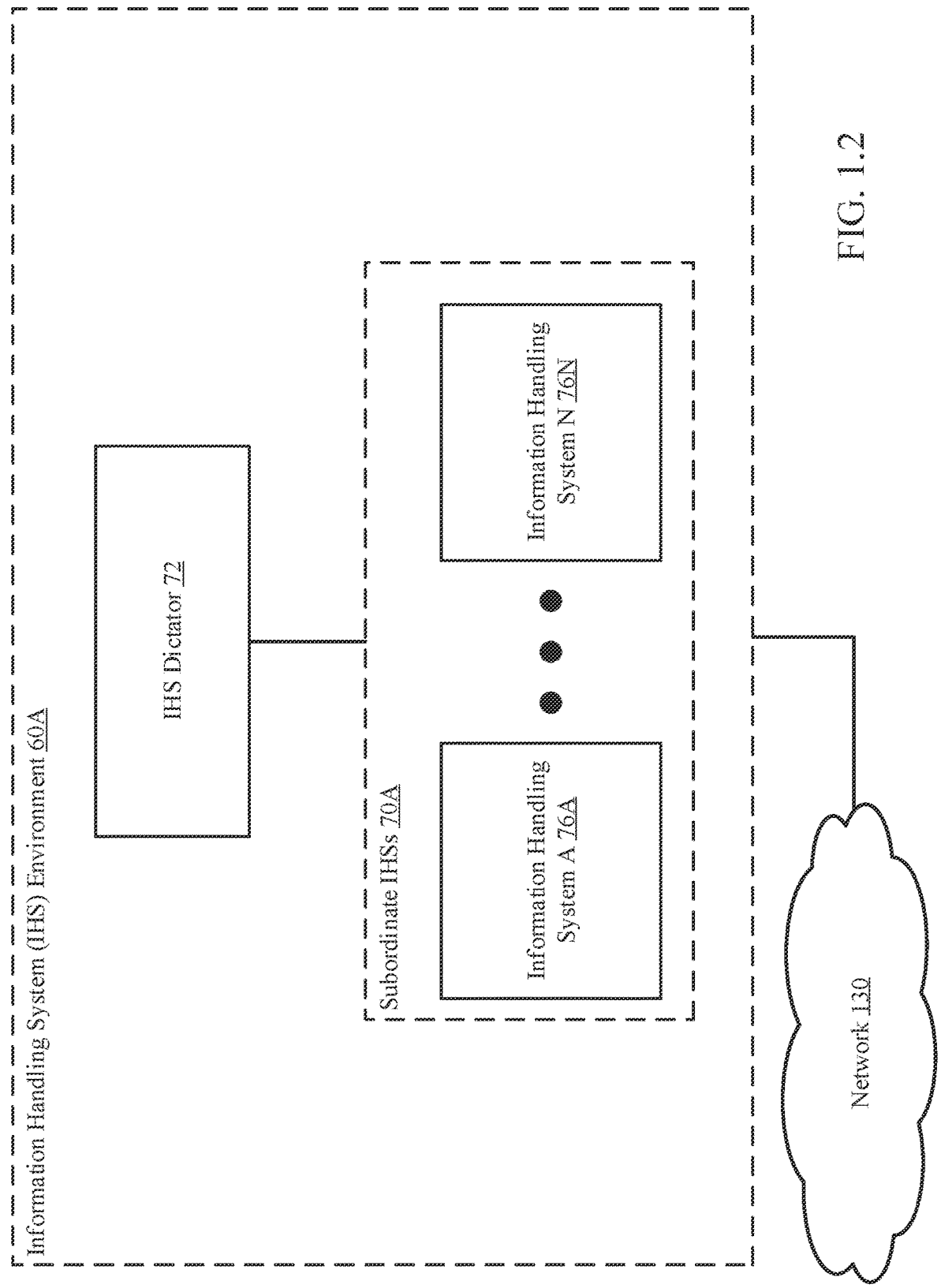
FIG. 1.2

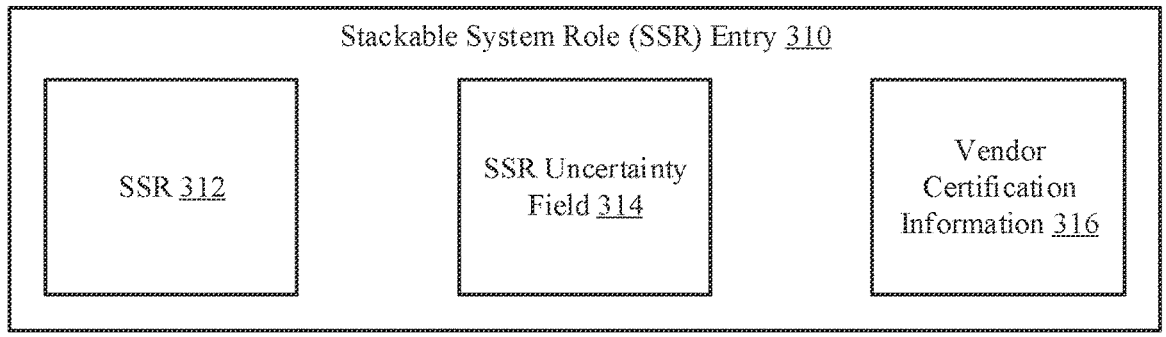
FIG. 3.1
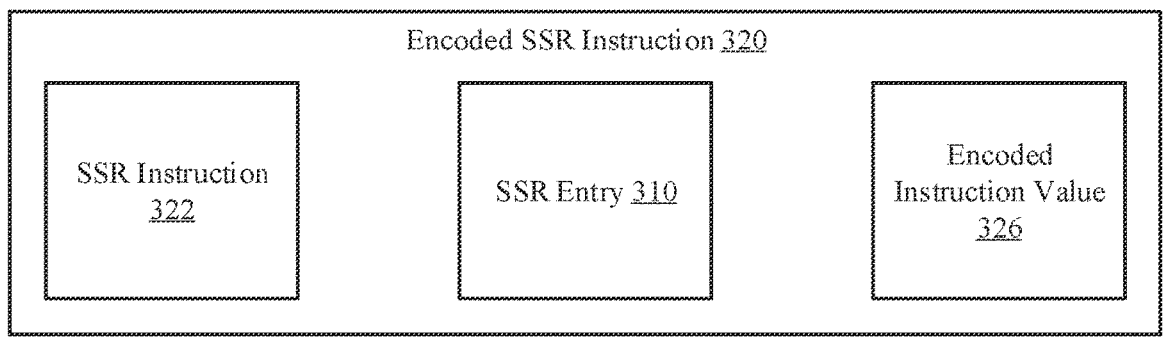
FIG. 3.2

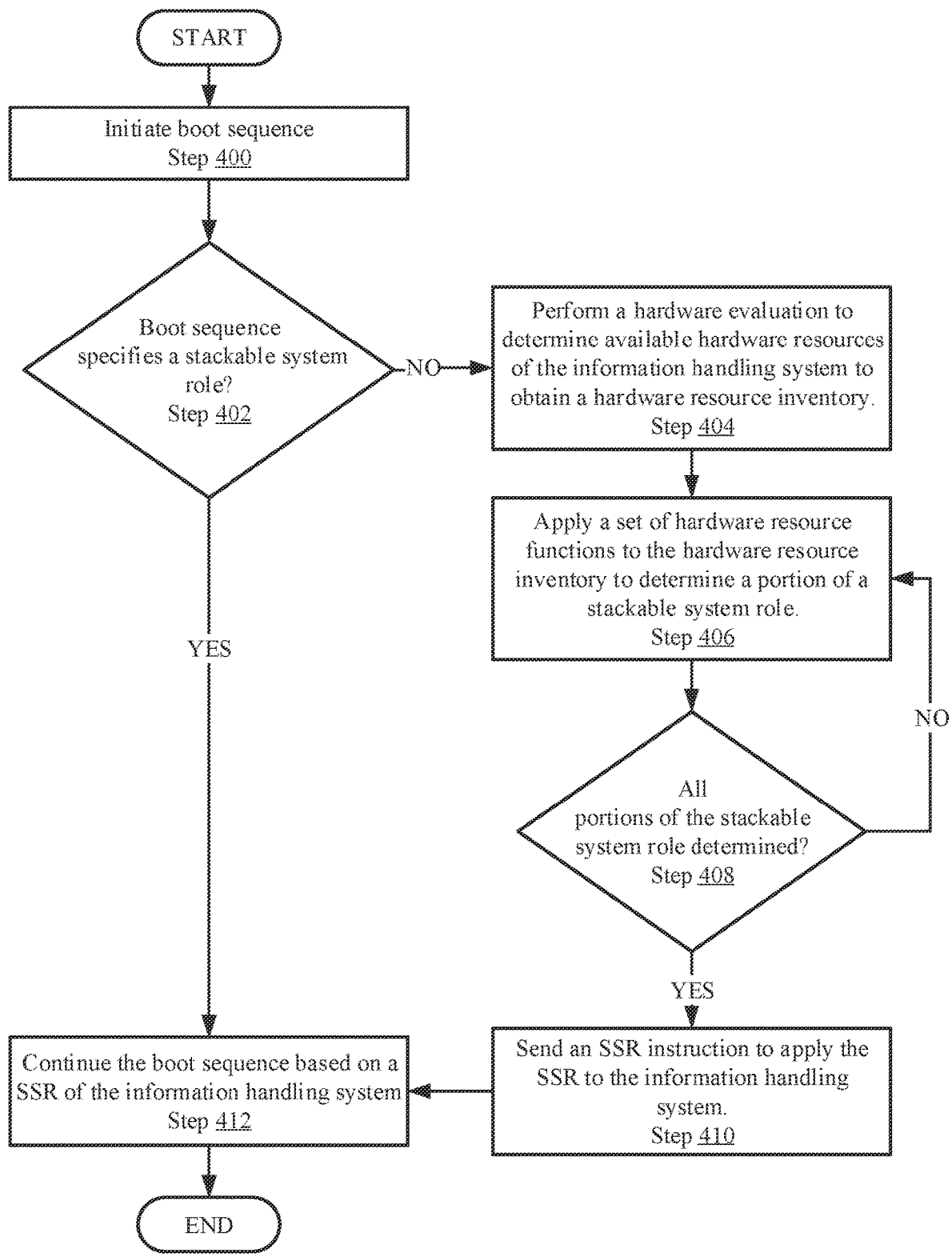
FIG. 4.1

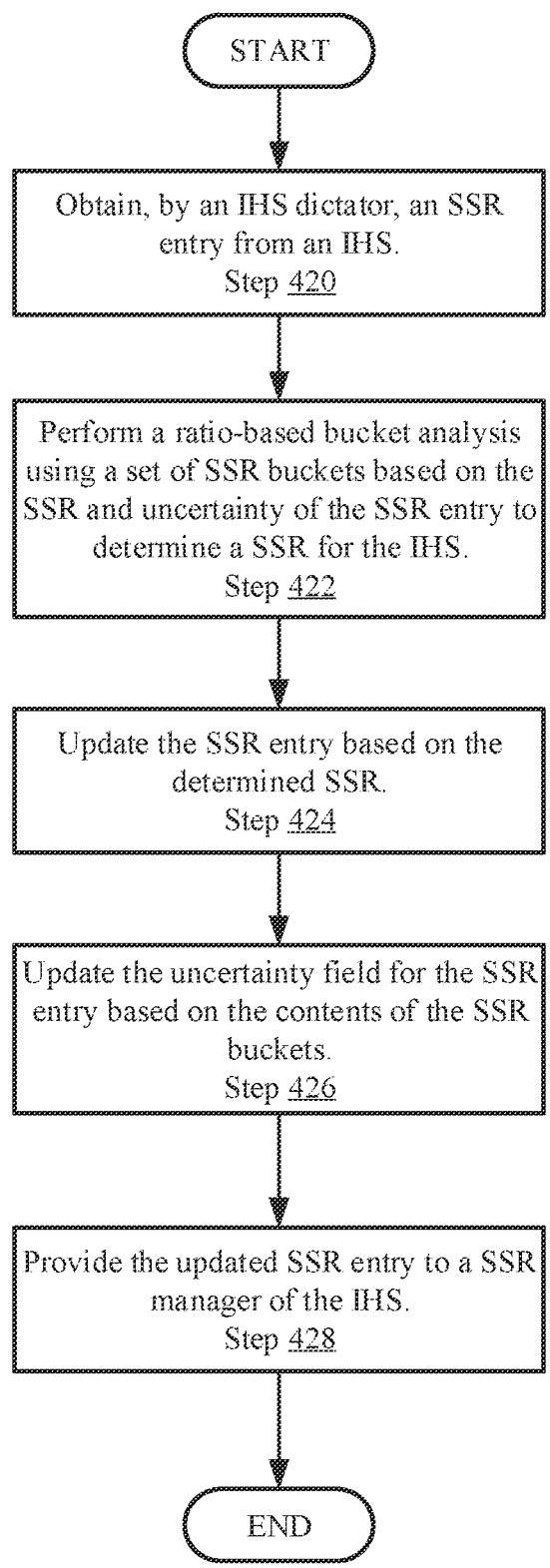
FIG. 4.2

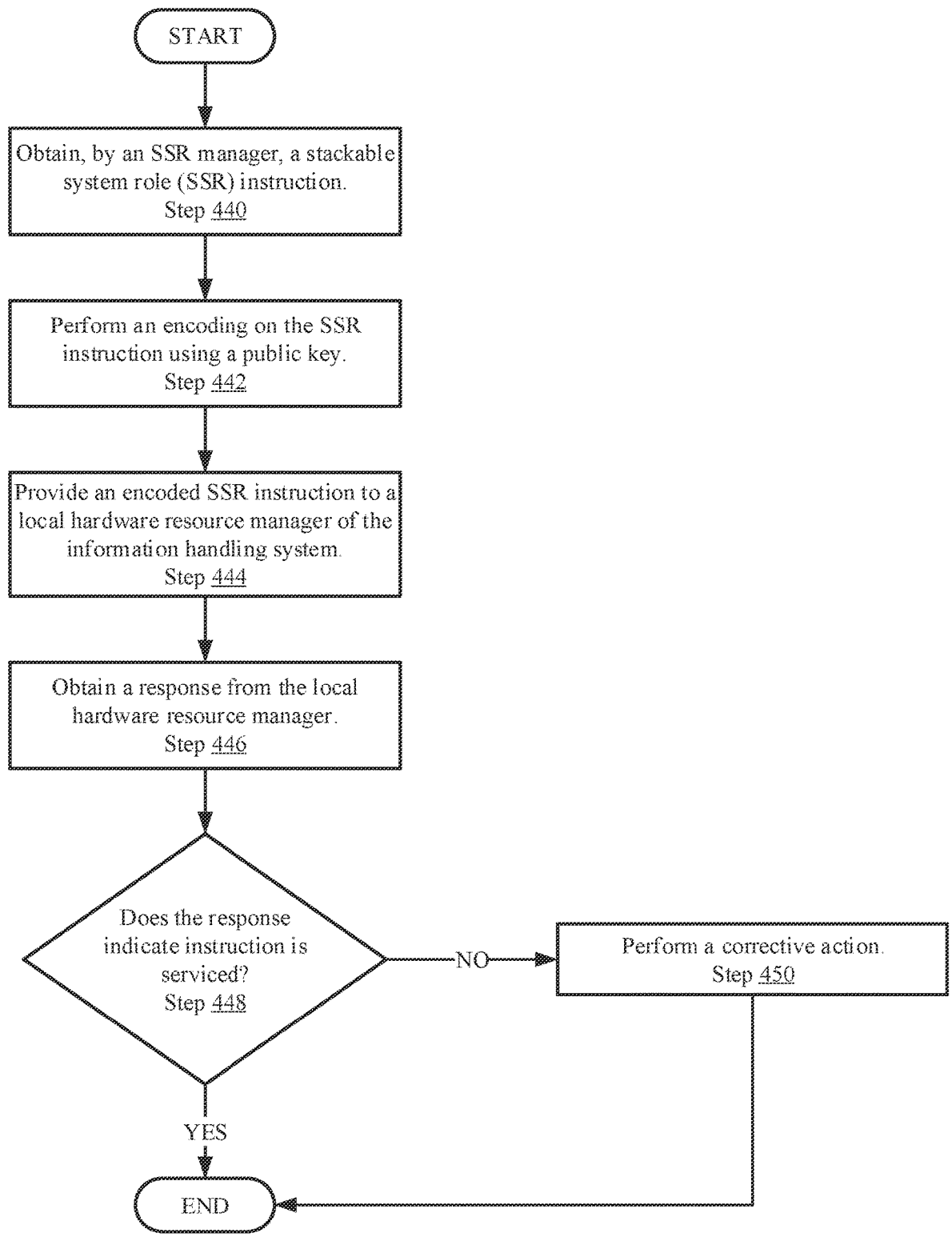
FIG. 4.3

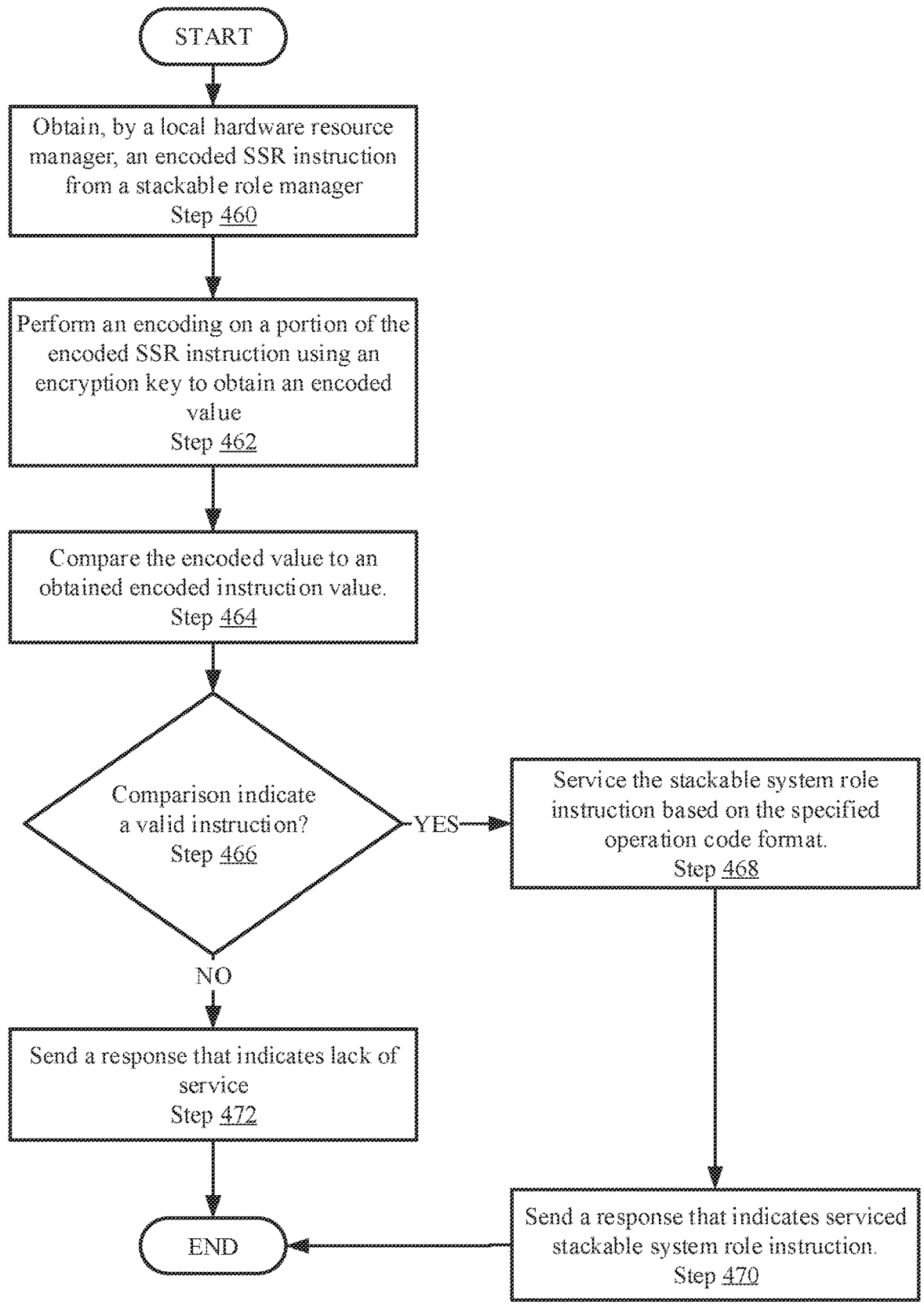
FIG. 4.4

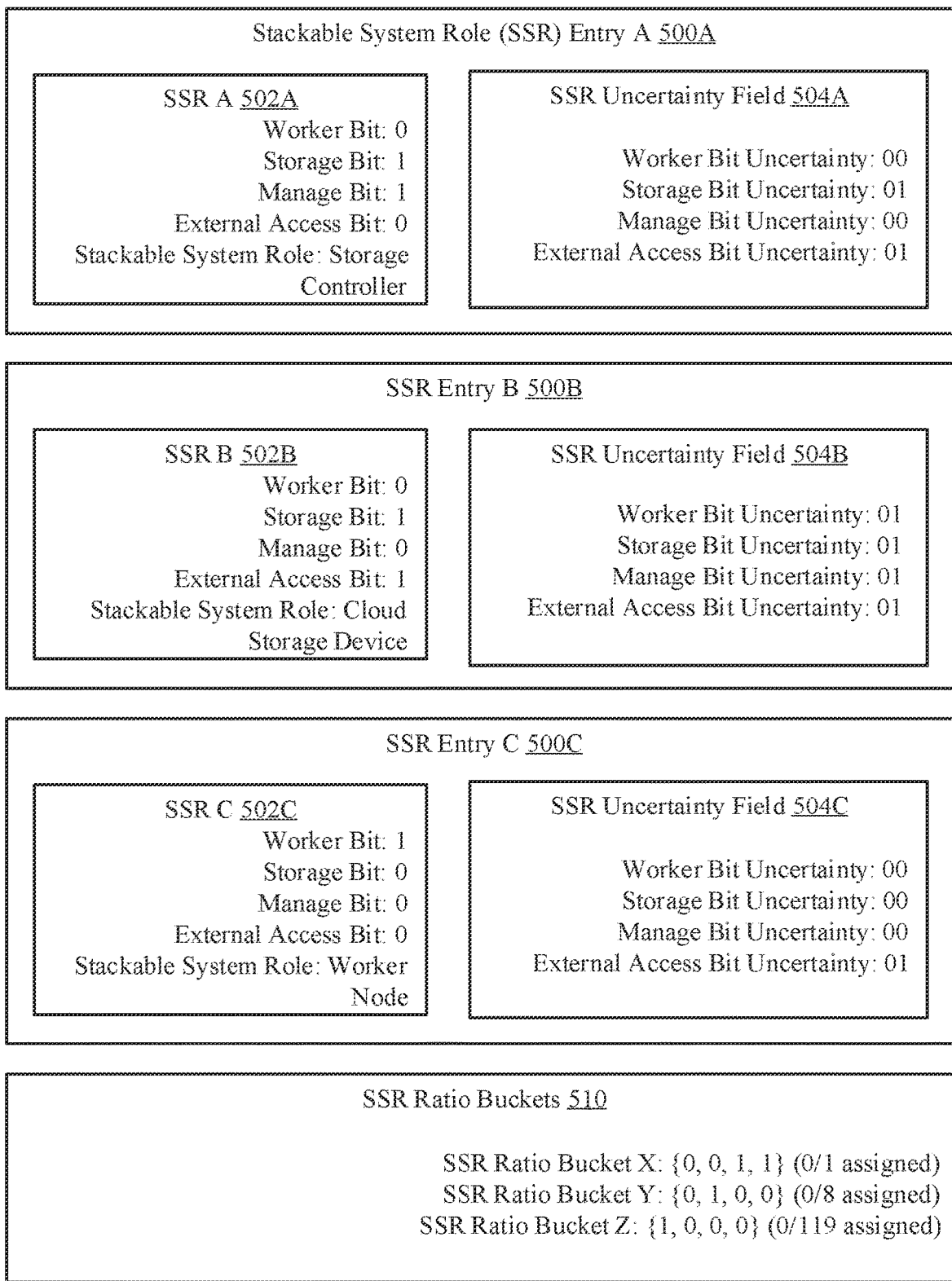
FIG. 5.1

Updated Stackable System Role (SSR) Entry A 520A

| Updated SSR A 522A | Updated SSR Uncertainty Field 524A |
|---|---|
| Worker Bit: 0<br>Storage Bit: 0<br>Manage Bit: 1<br>External Access Bit: 1<br>Stackable System Role: Login Server | Worker Bit Uncertainty: 00<br>Storage Bit Uncertainty: 00<br>Manage Bit Uncertainty: 00<br>External Access Bit Uncertainty: 00 |

Updated SSR Entry B 520B

| Updated SSR B 522B | Updated SSR Uncertainty Field 524B |
|---|---|
| Worker Bit: 0<br>Storage Bit: 1<br>Manage Bit: 0<br>External Access Bit: 0<br>Stackable System Role: Local Storage Device | Worker Bit Uncertainty: 00<br>Storage Bit Uncertainty: 00<br>Manage Bit Uncertainty: 00<br>External Access Bit Uncertainty: 00 |

Updated SSR Entry C 520C

| Updated SSR C 522C | Updated SSR Uncertainty Field 524C |
|---|---|
| Worker Bit: 1<br>Storage Bit: 0<br>Manage Bit: 0<br>External Access Bit: 0<br>Stackable System Role: Worker Node | Worker Bit Uncertainty: 00<br>Storage Bit Uncertainty: 00<br>Manage Bit Uncertainty: 00<br>External Access Bit Uncertainty: 00 |

Updated SSR Ratio Buckets 530

SSR Ratio Bucket X: {0, 0, 1, 1} (1/1 assigned)
SSR Ratio Bucket Y: {0, 1, 0, 0} (1/8 assigned)
SSR Ratio Bucket Z: {1, 0, 0, 0} (1/119 assigned)

FIG. 5.2

METHOD AND SYSTEM FOR DETERMINING STACKABLE SYSTEM ROLES FOR INFORMATION HANDLING SYSTEMS BASED ON COLLECTIVE NEED

BACKGROUND

Computing devices may provide services. To provide the services, the computing devices may include hardware components and software components. The services provided by the computing devices may be limited by these components.

SUMMARY

In general, in one aspect, the invention relates to a method for managing information handling systems. The method includes obtaining, by an information handling system dictator, a stackable system role (SSR) entry from an information handling system, in response to the obtaining, performing a ratio-based bucket analysis using a set of SSR buckets to obtain a determined SSR for the IHS, wherein each of the SSR buckets corresponds to a unique SSR, updating the SSR entry based on the determined SSR to obtain an updated SSR entry, and providing the updated SSR entry to a SSR manager of the information handling system.

In general, in one aspect, the invention relates to a non-transitory computer readable medium that includes computer readable program code, which when executed by a computer processor enables the computer processor to perform a method for managing information handling systems. The method includes obtaining, by an information handling system dictator, a stackable system role (SSR) entry from an information handling system, in response to the obtaining, performing a ratio-based bucket analysis using a set of SSR buckets to obtain a determined SSR for the IHS, wherein each of the SSR buckets corresponds to a unique SSR, updating the SSR entry based on the determined SSR to obtain an updated SSR entry, and providing the updated SSR entry to a SSR manager of the information handling system.

In general, in one aspect, the invention relates to an information handling system that includes a processor, and memory including instructions, which when executed by the processor, perform a method. The method includes obtaining, by an information handling system dictator, a stackable system role (SSR) entry from an information handling system, in response to the obtaining, performing a ratio-based bucket analysis using a set of SSR buckets to obtain a determined SSR for the IHS, wherein each of the SSR buckets corresponds to a unique SSR, updating the SSR entry based on the determined SSR to obtain an updated SSR entry, and providing the updated SSR entry to a SSR manager of the information handling system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system environment in accordance with one or more embodiments of the invention.

FIG. 3.1 shows a diagram of a stackable system role entry in accordance with one or more embodiments of the invention.

FIG. 3.2 shows a diagram of an encoded SSR instruction in accordance with one or more embodiments of the invention.

FIG. 4.1 shows a flowchart of a method of initiating a stackable system role instruction in accordance with one or more embodiments of the invention.

FIG. 4.2 shows a flowchart of a method of servicing an encoded stackable system role instruction in accordance with one or more embodiments of the invention.

FIG. 4.3 shows a flowchart of a method of determining a stackable system role for an information handling system in accordance with one or more embodiments of the invention.

FIG. 4.4 shows a flowchart of a method of determining a set of stackable system roles for a set of information handling system in a committee in accordance with one or more embodiments of the invention.

FIGS. 5.1-5.2 shows a diagram of the operation of an example system over time in accordance with one or more embodiments of the invention.

DETAILED DESCRIPTION

Figure 2:
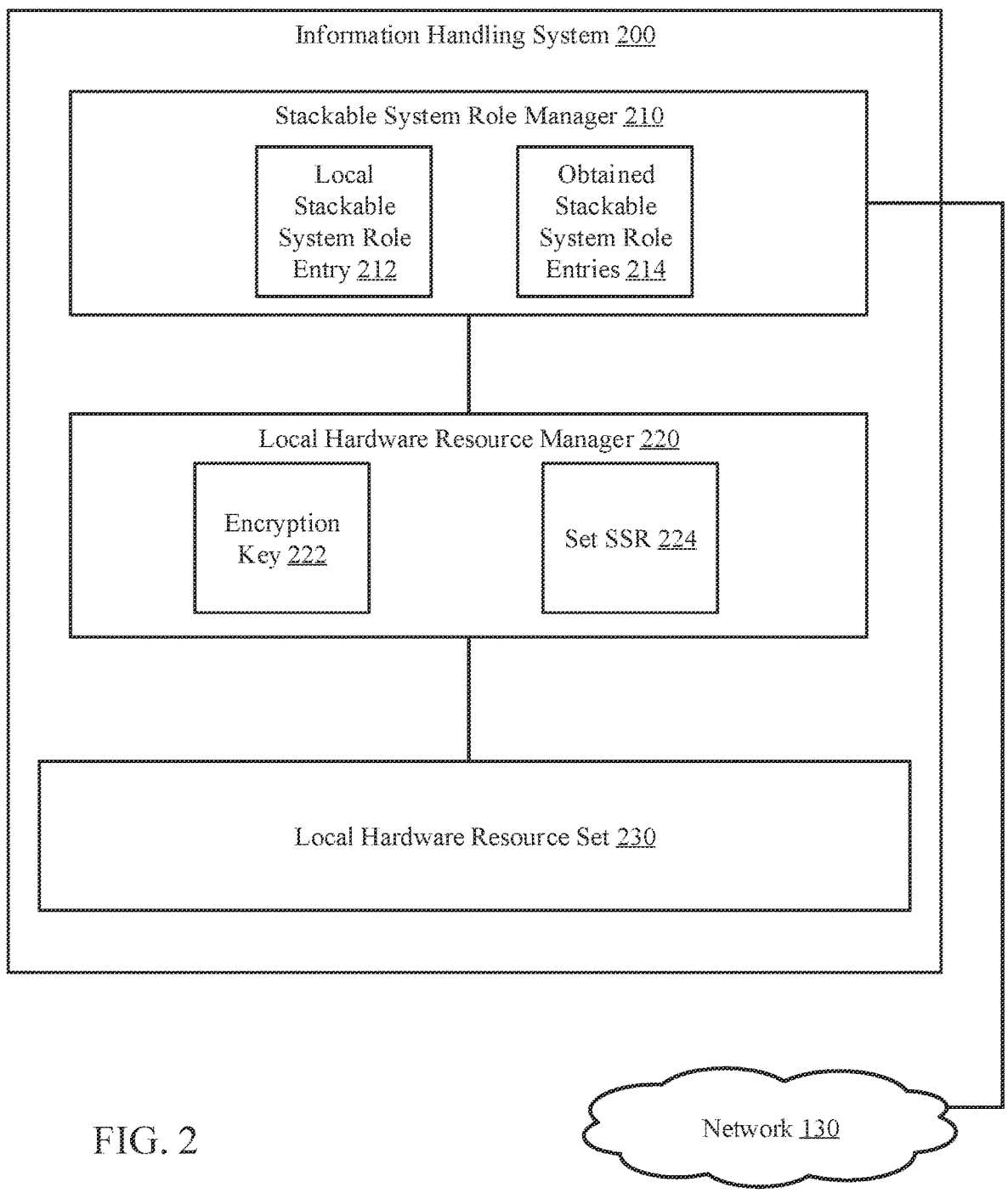
FIG. 2 shows a diagram of an information handling system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments of the invention relate to systems, devices, and methods for managing information handling systems. Specifically, embodiments of the invention relate to a method for securely applying a setting to an information handling system. The setting may be a stackable system role (SSR). The application of a stackable system role may be performed using a public key provided to a SSR manager of the information handling system. The public key may be used to encrypt a SSR instruction to generate an encoded value. The SSR instruction and the encoded value (collectively an encoded SSR instruction) may be provided to a local hardware resource manager of the information handling system. The local hardware resource manager may utilize a private encryption key to determine whether the SSR instruction is valid and, if such determination is made, service the SSR instruction.

Embodiments of the invention may include, during a boot sequence performed by a set of information handling systems, determining a SSR for an information handling system using a hardware resource inventory for the information handling system. A set of hardware resource functions may be applied to the hardware resource inventory to obtain settings for an SSR entry. The SSR entry includes a SSR, which may include at least a worker setting, a storage setting, a manage setting, and an external access setting. The set of hardware resource functions may include conditions for configuring each of the aforementioned settings.

Embodiments of the invention further include a method for enabling a dictator information handling system to obtain self-determined SSRs from any number of information handling systems in an information handling system environment and performing a re-determination of an SSR for each information handling system in the information handling environment based on a collective need for certain SSRs. The dictator information handling system may send the determined SSRs to the respective SSRs.

FIG. 1.1 shows a system in accordance with one or more embodiments of the invention. The system may include any number of information handling systems (62, 64) in an information handling environment (60). The information handling system environment (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling system environment (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

In general, embodiments of the invention relate to systems, methods, and devices for managing the hardware resources of the information handling systems (62, 64) and/or other resources to provide computer implemented services. The hardware resources of the information handling systems (62, 64) may be managed by applying (or otherwise setting) a stackable system role to an information handling system (62, 64) managing the hardware resources. In one or more embodiments of the invention, a stackable system role is a dynamic role applied to an information handling system (62, 64) that is used to specify a functionality, an intended use, and/or an operational capability of the information handling system (62, 64). For example, the SSR may be used to determine a set of computer implemented services best suited to be provided by a corresponding information handling system based on a deployment of the information handling system and other information handling systems in the information handling system environment (60). For additional details regarding the stackable system roles (SSRs), see, e.g., FIG. 3.1.

In one or more embodiments of the invention, the application of SSRs to each information handling system (e.g., 62, 64) in the information handling system environment (60) may be based on the implementation of the information handling system environment (60). For example, the information handling system environment (60) may include information handling systems (e.g., 62, 64) that independently determine their respective SSRs and influence their determination based on the determination of other information handling systems of their respective SSRs. In such embodiments, the process of self-determining a SSR may be performed using, for example, the method of FIG. 4.1.

As a second example, the information handling system environment (60) may include dictator information handling systems that are designated to determine SSRs for other information handling systems in a subset of information handling systems. The determined SSRs may be provided to the respective information handling systems in the entire information handling system environment (60). For additional details regarding such embodiment, see, e.g., FIG. 1.2.

The system of FIG. 1.1 may include any number of information handling systems (e.g., 62, 64), the clients (e.g., 32, 34), and any number of administrators (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The administrators (50), information handling system environment (60), and/or clients (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the administrators (50), information handling system environment (60), and/or clients (30) described in this application and/or all, or a portion, of the methods illustrated in FIGS. 4.1-4.4. The administrators (50), information handling system environment (60), and/or clients (30) may be implemented using other types of computing devices without departing from the invention. For additional details regarding computing devices, refer to FIG. 6.

While the system of FIG. 1.1 has been illustrated and described as including a limited number of specific components, a system in accordance with embodiments of the invention may include additional, fewer, and/or different components without departing from the invention.

FIG. 1.2 shows a diagram of an information handling system environment in accordance with one or more embodiments of the invention. The information handling system environment (60A) illustrated in FIG. 1.2 may be an embodiment of the information handling system (60) discussed in FIG. 1.1. Turning to FIG. 1.2, the information handling system environment (60A) includes an information handling system (IHS) dictator (72) and a set of one or more subordinate IHSs (70A). The information handling system environment (60A) may include additional, fewer, and/or different components without departing from the invention.

In one or more embodiments of the invention, the IHS dictator (72) is an IHS that determines the SSRs for all IHSs (e.g., 76A, 76N) in the IHS environment (60A). The IHS dictator may perform such determinations by performing, for example, the method of FIG. 4.2.

Turning to FIG. 2, FIG. 2 shows a diagram of an information handling system (200) in accordance with one or more embodiments of the invention. Any of the information handling systems (e.g., 62, 64, FIG. 1.1, 72, 74, 76A, 76N, 86A, 86N, 92, 112, 116A 116N) of FIGS. 1.1-1.2 may be similar to the information handling system (200) illustrated in FIG. 2.

As discussed above, the information handling system (200) may provide any quantity and type of computer implemented services. To provide computer implemented services, the information handling system (200) may include a stackable system role manager (210), a local hardware resource manager (220), and any number of hardware resources in a hardware resource set (230).

The stackable system role manager (210) of the information handling system (200) may facilitate determining the SSR of the information handling system (200). To facilitate such determinations, the stackable system role manager (210) may utilize a local stackable system role entry (212).

In one or more embodiments of the invention, the local stackable system role entry (212) is an updatable data structure generated by the information handling system (200). The local stackable system role entry (212) may specify a stackable system role (further discussed in FIG. 3.1) to be applied to the information handling system (200). The local stackable system role entry (212) may further specify an uncertainty for the stackable system role. In one or more embodiments of the invention, the uncertainty of a stackable system role may be a value representing a confidence (or lack thereof) for the information handling system to be associated with the stackable system role.

In one or more embodiments of the invention, the determination of the stackable system role and the uncertainty of the stackable system role is based, at least in part, by obtained stackable system role entries (214). In one or more embodiments of the invention, the obtained stackable system role entries (214) are data structures obtained from other information handling systems in the information handling system environment. The other information handling systems may provide the obtained stackable system role entries to the information handling system (200) based on a boot sequence performed by the information handling system (200) and/or by the other information handling systems. In one or more embodiments of the invention, the boot sequence is performed in accordance with the method of FIG. 4.3. The boot sequence may be performed via other methods without departing from the invention. For additional details regarding a stackable system role entry (e.g., a local stackable system role entry (212) or an obtained stackable system role entry (214)), see FIG. 3.1.

In one or more embodiments of the invention, the local hardware resource manager (220) manages the use of local hardware resources of the local hardware resource set (230). Specifically, the local hardware resource manager (220) includes functionality for monitoring the access to the local hardware resources by external entities (e.g., clients, other information handling systems, and/or applications executing thereof). The local hardware resource manager (220) may manage the use of the local hardware resources during a deployment (e.g., as the information handling system (200) is applied to a stackable system role) the applied stackable system role (or set SSR (224)) is stored and easily accessible by the local hardware resource manager (220) to be used to determine how the hardware resources are to be used by the external entities.

For example, if the set SSR (224) specifies that the information handling system (200) is assigned a stackable system role of cloud storage device, then the local hardware resource manager (220) monitors the usage of the hardware resources in the local hardware resource set (230) to ensure that the local hardware resources are used, at least primarily, to perform the functionality of a cloud service device. Such functionality may include an emphasis on the storage devices and the network devices of the local hardware resource set (230) for storage and transfer of data with low latency.

In one or more embodiments of the invention, the local hardware resource manager (220) utilizes an encryption key (222) to determine whether a SSR instruction (further discussed in FIG. 3.2) is a valid instruction. The local hardware resource manager (220) may utilize the encryption key (222) in accordance with FIG. 4.2.

In one or more embodiments of the invention, the local hardware resource manager (220) includes functionality for preparing the hardware resources of the local hardware resource set (230) for presentation to the external entities.

The information handling system (200) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (200) described in this application and/or all, or a portion, of the methods illustrated in FIGS.

4.1-4.4. The information handling system (200) may be implemented using other types of computing devices without departing from the invention. For additional details regarding computing devices, refer to FIG. 6.

While the information handling system (200) has been illustrated and described as including a limited number of specific components, an information handling system in accordance with embodiments of the invention may include additional, fewer, and/or different components without departing from the invention.

The local hardware resource set (230) may include any number and types of hardware devices that may provide any quantity and type of computing resources. For example, the local hardware resource set (230) may include storage devices, memory devices, and special purpose devices.

The storage devices may provide storage resources (e.g., persistent storage) in which applications hosted by an information handling system may store data including any type and quantity of information. The storage devices may include any type and quantity of devices for storing data. The devices may include, for example, hard disk drives, solid state drives, tape drives, etc. The storage devices may include other types of devices for providing storages resources without departing from the invention. For example, the storage devices may include controllers (e.g., redundant array of disk controllers), load balancers, and/or other types of devices.

The memory devices may provide memory resources (e.g., transitory and/or persistent storage) in which an information handling system may store data including any type and quantity of information. The memory devices may include any type and quantity of devices for storing data. The devices may include, for example, transitory memory such as random access memory, persistent memory such as enterprise class memory, etc. The memory devices may include other types of devices for providing memory resources without departing from the invention. For example, the storage devices may include controllers (e.g., replication managers), load balancers, and/or other types of devices.

The special purpose devices may provide other types of computing resources (e.g., graphics processing resources, computation acceleration resources, etc.) to information handling systems. The special purpose devices may include any type and quantity of devices for providing other types of computing resources. The special purpose devices may include, for example, graphics processing units for providing graphics processing resources, compute accelerators for accelerating corresponding workloads performed by information handling systems, application specific integrated circuits (ASICs) for performing other functionalities, digital signal processors for facilitating high speed communications, field-programmable gate arrays (FPGAs), etc. The special purpose devices may include other types of devices for providing other types of computing resources without departing from the invention.

While the local hardware resource set (230) has been illustrated and described as including a limited number of specific components, hardware resources in accordance with embodiments of the invention may include additional, fewer, and/or different components without departing from the invention.

As discussed above, an information handling system may utilize stackable system role entries to be determined by the information handling system and/or broadcasted to other information handling systems. FIG. 3.1 shows a diagram of a SSR entry (310) in accordance with one or more embodiments of the invention. The SSR entry (310) may be an embodiment of a local SSR entry (212, FIG. 2) or an obtained SSR entry (214, FIG. 2) discussed above. The SSR entry (310) illustrated in FIG. 3 may include a stackable system role (312), a SSR uncertainty field (314), and vendor certification information (316). The SSR entry (310) may include additional, fewer, and/or different portions without departing from the invention.

In one or more embodiments of the invention, the SSR (312) specifies a role of the SSR entry (310). As discussed above, a SSR is a role to be applied to an information handling system that specifies a functionality, an intended use, and/or an operational capability of the information handling system. The SSR may further be determined relative to the information handling system environment. Said another way, the SSR may be determined based on the needs of an information handling system environment in which the information handling system is operating.

For example, consider a scenario in which an information handling environment operates to provide cloud-based services. IHS A and IHS B may both include the appropriate hardware resources to be considered a SSR of cloud storage device. However, IHS A may further include the appropriate hardware resource to be an edge device. The information handling system environment may require the use of both a cloud storage device and an edge device. Based on these requirements, IHS A may determine that its stackable system role is that of an edge device, and IHS B may determine that its stackable system role is that of a cloud storage device.

In one or more embodiments of the invention, the SSR (312) is implemented as a four-bit data item. Each bit in a four-bit data item may correspond to a general functionality setting. The setting of each bit (e.g., 0 or 1) may correspond to whether it is determined that an IHS of the SSR entry (310) is to be associated with the general functionality. Examples of general functionalities include, but are not limited to: worker functionality, storage functionality, manage functionality, and external access functionality. The worker functionality may correspond to an intended use of an IHS to execute heavy computations. A bit in the four-bit data item may correspond to a worker setting. The storage functionality may correspond to an intended use of an IHS to store large amounts of data. A bit in the four-bit data item may correspond to a storage setting. The manage functionality may correspond to an intended use to manage multiple entities (e.g., other IHSs) in the IHS environment. A bit in the four-bit data item may correspond to a manage setting. The external access functionality corresponds to an intended use for the IHS to transfer large amounts of data between IHSs. A bit in the four-bit data item may correspond to an external access setting. In such embodiments, the SSR (312) may be a combination of the four settings (e.g., the worker setting, the storage setting, the manage setting, and the external access setting).

In one or more embodiments of the invention, the SSR uncertainty field (314) is a data structure that specifies an uncertainty for the SSR (312). The SSR uncertainty field (314) may specify a confidence (or lack thereof) that the SSR (312) is to be applied to the IHS.

The SSR uncertainty field (314) may be implemented as a series of bits that correspond to an uncertainty for each general functionality setting as discussed above. For example, in such embodiments in which the SSR (312) is a four-bit data item, the SSR uncertainty field (314) may correspond to two bits for each of the four general functionalities. In such embodiments, the SSR uncertainty field (314) may correspond to an eight-bit data item.

In one or more embodiments of the invention, the vendor certification information (316) is a data structure that specifies certification by the vendor of the IHS to the client. The vendor certification information (316) may be used to certify a client that the hardware, software, and/or firmware settings of the components in the IHS meet the expectations of the clients. The vendor certification information (316) may be information intended to only be generated by a vendor of the IHS (or a source trusted by the vendor and/or the client utilizing the IHS).

As an IHS determines a SSR (312) in a SSR entry is to be applied to an IHS, the SSR manager of such IHS may perform the method of FIG. 4.1 to generate an encoded SSR instruction. FIG. 3.2 shows a diagram of an encoded SSR instruction in accordance with one or more embodiments of the invention. The encoded SSR instruction (320) may include a SSR instruction (322), a SSR entry (310), and an encoded instruction value (326). The SSR entry (310) may include at least a portion of the SSR entry (310) discussed above.

In one or more embodiments of the invention, the SSR instruction (322) is a data structure that specifies an instruction to be executed by a local hardware resource manager of an IHS corresponding to an SSR of the IHS. The SSR instruction may specify reading an existing applied SSR of the IHS, writing a SSR specified in the SSR entry (310) to the IHS, and/or resetting the SSR of the IHS to no SSR. The SSR instruction (322) may specify other instructions without departing from the invention.

In one or more embodiments of the invention, the encoded instruction value (326) is a data structure that is used for verification purposes. The encoded instruction value (326) may be generated by encoding at least a portion of the SSR instruction and/or the SSR entry (310) using an encryption key. The encryption key may be an encryption key obtained from the local hardware resource manager. The encoded instruction value may be encoded using any other mechanism without departing from the invention.

FIG. 4.1 shows a flowchart of a method in accordance with one or more embodiments of the invention. The method depicted in FIG. 4.1 may be performed to self-determine a SSR for an IHS in accordance with one or more embodiments of the invention. The method shown in FIG. 4.1 may be performed by, for example, a stackable system role manager (e.g., 210, FIG. 2). Other components of the system in FIG. 2 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a boot sequence is initiated. In one or more embodiments of the invention, the boot sequence may be initiated for an IHS in an IHS environment. During the boot sequence, the IHS may identify a set SSR (if any) of the IHS.

In step 402, a determination is made about whether the boot sequence specifies a stackable system role. If the boot sequence specifies a SSR, the method proceeds to step 454; otherwise, the method proceeds to step 444.

In step 404, a hardware evaluation is performed to determine a set of available hardware resources of the information handling system. In one or more embodiments of the invention, the hardware evaluation is a method of identifying hardware resource information corresponding to the hardware resource set of the IHS. The hardware evaluation may include using an existing hardware resource inventory to determine whether the existing hardware resources are available for use by the information handling system. Alternatively, the hardware evaluation may include populating the hardware resource inventory with identified hardware resources of the information handling system. Examples of hardware resources include, but are not limited to: a number of storage devices (e.g., hard disk drives, solid-state drives, etc.), a number of network line cards, a number of processors (e.g., central processing units (CPUs), graphics processing units (GPUs), etc.), a number of processing cores, an amount of memory, and/or an amount of storage space.

In one or more embodiments of the invention, the hardware resource inventory may further include vendor certification information. The vendor certification information may be obtained from vendors of the hardware resources.

In step 406, a set of hardware resource functions are applied to the hardware resource inventory to determine a portion of a stackable system role of the information handling system. The portion may be determined by configuring the stackable system role based on any of the hardware resource functions.

For example, an IHS may include a large number of storage devices and include a high network bandwidth. A first hardware resource function may specify a condition that a storage setting of the stackable system role may be configured to be on if the number of storage devices exceeds two. A second hardware resource function may specify a second condition that an external access setting of the stackable system role may be configured to be on if the network bandwidth exceeds 50 GB/s. In this example, each hardware resource function may correspond to a portion of the stackable system role. A first portion includes the storage setting. A second portion includes the external access setting. The SSR manager may determine a SSR of a cloud storage device, which is a role that is intended to be heavily used for storage and external access.

In one or more embodiments of the invention, the hardware resource functions are used to generate an uncertainty field for the SSR. As discussed above, the uncertainty field may be a value corresponding to an uncertainty of the SSR. In the example discussed above, the uncertainty field of a storage setting may be generated based on the number of storage devices. The uncertainty field may correspond to a low uncertainty if the number of storage devices are substantially large.

For example, if the IHS includes more than one central processing units (CPUs), but the IHS has not used the multiple CPUs all at one time, the uncertainty of the SSR having the worker setting to 1 may be fair to high. In other words, the worker setting (which is a setting that requires use of a high amount of processing) of 1 set in the SSR may correspond to a higher than low uncertainty (e.g., a fair or a high uncertainty).

In step 408, a determination is made about whether all portions of the stackable system role are determined. If all portions of the stackable system role are determined, the method proceeds to step 410; otherwise, the method proceeds to step 410.

In one or more embodiments of the invention, after all portions of the stackable system roles are processed, a SSR entry is generated. The SSR entry may specify the SSR (e.g., the configuration of each portion of the SSR), the SSR uncertainty field, and any vendor certification bits generated based on the vendor certification information discussed above.

In one or more embodiments of the invention, prior to proceeding to step 410, the method proceeds to providing the SSR entry to an information handling system dictator. The information handling system dictator may process the SSR entry in accordance with FIG. 4.2. The result of the processing is obtaining, by the stackable system role manager, a determined SSR entry. In such embodiments, the SSR entry discussed in steps 410 and 412 refer to the determined SSR entry obtained from the information handling system dictator.

In step 410, an SSR instruction is sent to a local hardware resource manager of the IHS. In one or more embodiments of the invention, the SSR instruction includes the SSR entry and a request to apply the specified SSR to the local hardware resource manager. The SSR instruction may be processed in accordance with FIG. 4.3.

In step 412, the boot sequence continues based on a SSR of the IHS. In one or more embodiments of the invention, the SSR is the SSR specified in the boot sequence as determined in step 402. Alternatively, the SSR is the SSR specified in the SSR entry as updated in accordance with steps 406-410.

FIG. 4.2 shows a flowchart of a method in accordance with one or more embodiments of the invention. The method depicted in FIG. 4.2 may be performed to determine a set of stackable system roles for a set of subordinate information handling systems in accordance with one or more embodiments of the invention. The method shown in FIG. 4.2 may be performed by, for example, an IHS dictator (e.g., 72, FIG. 1.2). Other components of the system in FIG. 1.2 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, the IHS dictator obtains a SSR entry from a subordinate IHS. The SSR may be the SSR entry generated in FIG. 4.1. Similarly, the subordinate IHS may be the information handling system of FIG. 4.1.

In step 422, a ratio-based bucket analysis is performed using a set of SSR buckets based on the SSR and uncertainty field of the SSR entry.

In one or more embodiments of the invention, the ratio-based buckets refer to a set of predetermined SSRs and a desired number of IHSs to be applied to each pre-determined SSR in an IHS environment. Each predetermined SSR and the corresponding desired number may be based on a collective need for the SSRs in the IHS environment. For example, consider a scenario in which an IHS environment is to be used as a cloud storage provider. The cloud storage provider may require a storage controller and 20 cloud storage devices. In such example, a first ratio-based bucket (also referred to as a bucket) includes a first predetermined SSR (e.g., a storage controller). The storage controller may relate to the following settings: {0, 1, 1, 1}, where the first bit refers to the worker setting of the SSR, the second bit refers to the storage setting, the third bit refers to the manage setting, and the fourth setting refers to the external access setting. A second bucket may refer to a second predetermined SSR (e.g., the cloud storage devices). The cloud storage device SSR may relate to the following setting: {0, 0, 1, 1}.

In one or more embodiments of the invention, the ratio-based bucket analysis includes analyzing the obtained SSR and SSR uncertainty field to determine a most likely ratio-based bucket to correspond to the SSR, determining that there is an available assignment of the IHS to the ratio-based bucket, and, based on the determination, replacing the obtained SSR with the SSR of the determined ratio-based bucket. In the above example, an obtained SSR may be determined to most likely align with one of the two buckets. If there is an available IHS to be assigned to the determined bucket, the SSR of the obtained SSR entry may be assigned to the predetermined SSR of the determined bucket.

In step 424, the SSR entry is updated based on the determined SSR. The determined SSR may refer to the predetermined SSR of the determined bucket. The SSR entry is updated to update the previously-specified SSR with the determined SSR.

In addition to updating the SSR entry, the ratio-based buckets are updated based on the assignment of the IHS. The update to the ratio-based buckets may include specifying the number of assigned IHSs in relation to the desired number of IHSs to be assigned. For example, consider a scenario in which a first bucket requires one IHS to be assigned a predetermined SSR, and an obtained SSR entry is processed to determined that the IHS of the SSR entry is to be assigned to the pre-determined SSR. In this example, the ratio-based bucket is updated to specify that one out of the one IHSs have been assigned to the ratio-based bucket.

In step 426, the uncertainty field for the SSR entry is updated based on the ratio-based buckets. In one or more embodiments of the invention, the SSR uncertainty field is updated by replacing the previously-specified SSR uncertainty field with a SSR uncertainty field based on a ratio between the assigned number of IHSs in the determined ratio-based bucket and the desired number. For example, if the determined ratio-based bucket desires 20 IHSs for a SSR and only one IHS is assigned to the determined ratio-based bucket, the updated SSR uncertainty field specifies a low uncertainty (e.g., the IHS is highly certain to be assigned the determined SSR). If the ratio between the assigned number of IHSs of a determined bucket and the desired number of IHSs to be assigned to the determined bucket is higher, the updated SSR uncertainty field may relate to a higher level of uncertainty.

In step 428, the updated SSR entry is provided to a SSR manager of the IHS. In one or more embodiments of the invention, the SSR manager is the SSR manager from which the SSR entry is obtained in step 420.

FIG. 4.3 shows a flowchart of a method in accordance with one or more embodiments of the invention. The method depicted in FIG. 4.3 may be performed to initiate a stackable system role instruction in accordance with one or more embodiments of the invention. The method shown in FIG. 4.3 may be performed by, for example, a stackable system role manager (e.g., 210, FIG. 2). Other components of the system in FIG. 2 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 440, the SSR manager obtains a SSR instruction. In one or more embodiments of the invention, the SSR instruction is obtained in response to a determination to instruct the IHS to read a currently applied SSR, to write a SSR, or to reset the currently applied SSR to null. Such determination may be performed by the SSR manager of the IHS. Alternatively, in one or more embodiments of the invention, the SSR instruction is obtained from an external entity (e.g., a second IHS or a client).

In step 442, an encoding is performed on the SSR instruction using a public key. In one or more embodiments of the invention, the public key is obtained from the local hardware resource manager. The encoding may be performed by performing an encoding algorithm on the SSR instruction (or a portion thereof) using the obtained public key on the obtained SSR instruction and the obtained SSR entry. The result of the encoding is an encoded instruction value. Collectively, the encoded SSR instruction includes the encoded instruction value, the SSR instruction, and the encoded instruction value.

In step 444, the encoded SSR instruction is provided to the local hardware resource manager of the information handling system.

In one or more embodiments of the invention, the encoded SSR instruction is processed via the method of FIG. 4.2 by the local data system manager. The encoded SSR instruction may be performed via any other method without departing from the invention.

In step 446, a response is obtained from the local hardware resource manager. In one or more embodiments of the invention, the response specifies whether the local hardware resource manager serviced the SSR instruction as requested by the local hardware resource manager. For example, if the SSR instruction specifies reading the SSR of the IHS entry, the response may specify the SSR instruction. As a second example, if the SSR instruction specifies resetting the SSR, the response may specify whether the SSR is reset. As a third example, if the SSR instruction specifies writing a SSR, the response may specify whether the SSR was applied as requested.

In step 448, a determination is made about whether the response indicates that the SSR instruction is serviced. If the SSR instruction is serviced, the method ends following step 408; otherwise, the method proceeds to step 410.

In step 450, following the determination that the SSR instruction is not serviced, a corrective action is performed. Examples of the corrective action includes, but are not limited to: regenerating and reencoding the SSR instruction, sending a request to the external entity to resend a valid SSR instruction, and/or simply resending the SSR instruction.

FIG. 4.4 shows a flowchart of a method in accordance with one or more embodiments of the invention. The method depicted in FIG. 4.4 may be performed to service an encoded SSR instruction in accordance with one or more embodiments of the invention. The method shown in FIG. 4.4 may be performed by, for example, a local hardware resource manager (e.g., 220, FIG. 2). Other components of the system in FIG. 2 may perform all, or a portion, of the method of FIG. 4.4 without departing from the invention.

While FIG. 4.4 is illustrated as a series of steps, any of the steps may be omitted, performed in a different order, additional steps may be included, and/or any or all of the steps may be performed in a parallel and/or partially overlapping manner without departing from the invention.

Turning to FIG. 4.4, in step 460, the local hardware resource manager obtains an encoded SSR instruction from a SSR manager. In one or more embodiments of the invention, the encoded SSR instruction is the encoded SSR instruction discussed in step 422 of FIG. 4.3.

In step 462, an encoding is performed on a portion of the encoded SSR instruction using an encryption key to obtain an encoded value. In one or more embodiments of the invention, the encoded SSR instruction includes an encoded instruction value and additional data (e.g., the SSR instruction and the SSR entry). The encoding may be performed on the additional data. The encoding may be similar to the encoding discussed in FIG. 4.3. The encryption key may be similar or different from the public key obtained by the SSR manager without departing from the invention.

In step 464, the encoded value is compared to an obtained encoded instruction value of the SSR instruction. In one or more embodiments of the invention, the encoded value generated in step 462 is compared to the obtained encoded instruction value by determining a similarity between the two values. If the two values are similar as expected (or identical as expected), the local hardware resource manager may determine that the obtained SSR instruction is valid. In such embodiments in which there is a discrepancy between the two values, the local hardware resource manager may determine that the SSR instruction is not valid.

In step 466, a determination about whether the comparison indicates that the SSR instruction is valid. If the SSR is determined to be valid; the method proceeds to step 428; otherwise, the method proceeds to step 432.

In step 468, following the determination that the SSR is indicated to be valid, the stackable system role instruction is serviced. In one or more embodiments of the invention, the servicing depends on the SSR instruction. For example, if the SSR instruction specifies reading the currently applied SSR, the local hardware resource manager accesses the set SSR of the IHS. As a second example, if the SSR instruction specifies to apply a SSR specified in the obtained SSR entry, the local hardware resource manager may replace the current SSR with the specified SSR. As a third example, if the SSR instruction specifies resetting the SSR, the local hardware resource manager removes the current SSR (if any) such that the IHS is no longer associated with a SSR.

In step 470, a response that indicates the SSR instruction is serviced is sent. The response may be sent to the SSR manager from which the encoded SSR instruction is obtained.

In step 472, following a determination that the SSR instruction is not valid, a response that indicates that indicates lack of service is sent. The response may be sent to the SSR manager from which the encoded SSR instruction is obtained.

To further clarify embodiments of the invention, a non-limiting example is provided in FIGS. 5.1-5.2. For the sake of brevity, only a limited number of components of the system of FIGS. 1.1-3.2 is illustrated in FIGS. 5.1-5.2.

Example

Consider a scenario in which three IHSs are to securely apply a SSR to each respective IHS. FIG. 5.1 includes a diagram of SSR entries each corresponding to an IHS. For the sake of brevity, the IHSs are not illustrated. SSR role entry A (500A) is a first SSR entry corresponding to a first IHS. SSR entry A (500A) includes a first SSR (502A) and a SSR uncertainty field (504A). Each SSR is determined by four settings: a worker setting determined by a worker bit, a storage setting determined by a storage bit, a manage setting determined by a manage bit, and an external access setting determined by an external access bit.

SSR A (502A) specifies that the IHS is determined to be a storage controller. Specifically, SSR A (502A) specifies that IHS A is set with a storage bit and a manager bit to 1, indicating that IHS A is capable of being a storage device and a manager device. Such combination results in the determination that the SSR is a storage controller. A storage controller may include functionality of storing large amounts of data and manage other storage devices.

The SSR entry (500A) further includes a SSR uncertainty field (504A). The uncertainty field is implemented as an eight-bit data item. The first two bits indicate an uncertainty of the worker bit, the next two bits indicate an uncertainty of the storage bit, the following two bits indicate an uncertainty of the manager bit, and the last two bits indicate an uncertainty of the external access bit. An uncertainty of 00 indicates a low uncertainty (e.g., a high certainty), an uncertainty of 01 indicates a fair uncertainty, an uncertainty of 10 indicates a high uncertainty, and an uncertainty of 11 is a very high uncertainty, which would be replaced with a low uncertainty of the opposite setting.

A SSR manager of IHS A performs the method of FIGS. 4.1 to identify the hardware resources of IHS A and apply a hardware resource function to the identified hardware resources to determine the SSR A (502A). For example, a hardware resource function that specifies a condition that having more than 10 hard disk drives results in setting the storage bit to 1 with a storage bit uncertainty of 00.

Similar to IHS A, IHS B (not shown in FIG. 5.1) includes a SSR entry (500B) that includes SSR B (502B) and a SSR uncertainty field (504B). SSR B (502B) specifies that IHS B is determined to be a cloud storage device. Specifically, SSR B (502B) specifies that IHS B is set with a storage bit and an external access bit to 1, indicating that IHS B is capable of being a storage device and an external access device. Such combination results in the determination that the SSR is to be a cloud storage device. A cloud storage device may include functionality for storing and transferring large amounts of data.

Further, IHS C (not shown in FIG. 5.1) includes a SSR entry (500C) that includes SSR C (502C) and a SSR uncertainty field (504C). SSR C (502C) specifies that IHS C is determined to be a worker node. Specifically, SSR C (502C) specifies that IHS C is set with a worker bit to 1, indicating that IHS C is capable of performing the functionality of a worker node. Such determination is based on a hardware evaluation of the hardware resources of IHS C. A worker node may include functionality for processing large amounts of data.

After each self-determination of the SSRs, an IHS dictator (not shown) obtains the SSR entries (500A, 500B, 500C) and processes the SSR entries in accordance with FIG. 4.2. Specifically, IHS dictator obtains SSR entry A (500A), analyzes SSRA (502A) and SSR uncertainty field (504A), and utilizes a SSR ratio bucket (510) to determine that SSR A (502A) most likely matches SSR ratio bucket X. This determination may be based on the low uncertainty of the worker bit and the manage bit and a fair uncertainty for the storage bit and the external access bit. The fair uncertainty allowed for the IHS dictator to select a SSR ratio bucket with a predetermined SSR that is does not alter the worker bit or the manage bit. Such SSR ratio bucket may be found in SSR ratio bucket X. As such, IHS A is assigned to SSR ratio bucket X. The updated SSR entry A (520A) is shown in FIG. 5.2.

Returning to FIG. 5.1, at a later point in time, the IHS dictator obtains SSR entry B (500B) from IHS B and processes it in accordance with FIG. 4.2. Because a maximum number of IHSs have been assigned to SSR ratio bucket X, SSR ratio bucket X is no longer an eligible SSR ratio for consideration for IHS B or any future IHSs. The result is selecting SSR bucket Y for IHS B based on SSR B (502B) most resembling the predetermined SSR of SSR bucket Y. As such, IHS B is assigned to SSR ratio bucket Y. The updated SSR entry B (520B) is shown in FIG. 5.2.

Returning to FIG. 5.1, at a later point in time, the IHS dictator obtains SSR entry C (500C) and processes it in accordance with FIG. 4.2. The result is selecting SSR bucket Z for IHS C based on SSR B (502B) most resembling the predetermined SSR of SSR bucket Y. As such, IHS B is assigned to SSR ratio bucket Y. The updated SSR entry B (520B) is shown in FIG. 5.2.

Turning to FIG. 5.2, the IHS dictator generates updated SSR entry A (520A) that includes the updated SSR A (502A) that resembles the predetermined SSR of SSR bucket X. Similarly, updated SSR entry B (520B) includes the updated SSR B (502B) that resembles the predetermined SSR of SSR bucket Y, and updated SSR entry C (520C) that includes the updated SSR C (502C) that resembles the predetermined SSR of SSR bucket Z. Further, each updated SSR entry (520A), includes an updated SSR uncertainty field (524A, 524B, 524C). Each updated SSR uncertainty field (524A, 524B, 524C) includes uncertainties of 00 for each uncertainty field because the corresponding IHSs are the only IHSs in their corresponding SSR ratio buckets. As such, there is a high certainty that the IHSs are to be assigned their respective updated SSRs (522A, 522B, 522C). Further, the SSR ratio buckets are updated based on the assignments to obtain updated SSR ratio buckets (530).

End of Example

Figure 6:
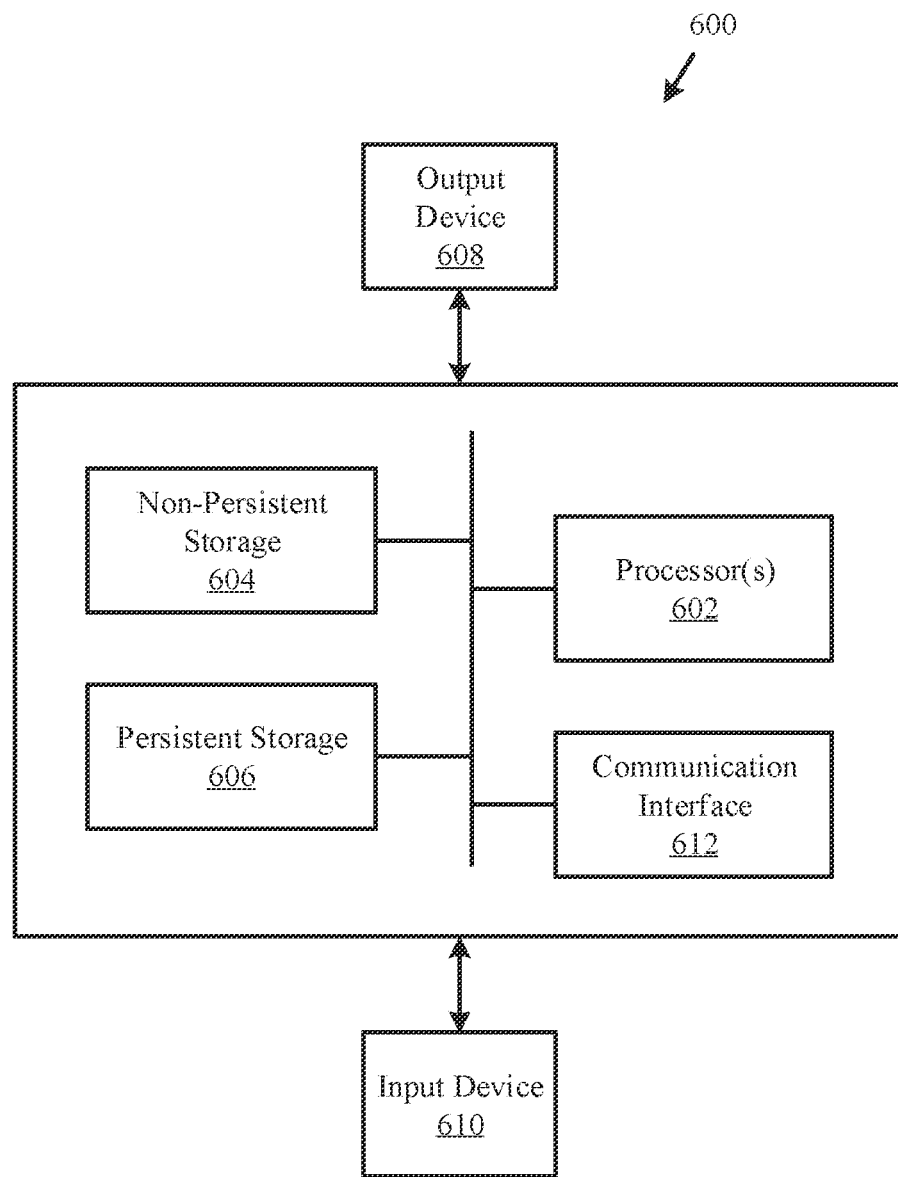
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system and method for managing the use and execution of computer-implemented services as provided by an IHS environment. Specifically, embodiments of the invention enable the efficient use of the IHSs in the IHS environment by utilizing hardware resource information to determine how to best utilize the IHS in the context of the IHS environment. Such use may be performed using stackable system roles, which utilize minimal data (e.g., a minimum number of bits), thus reducing a burden on the memory of the IHS. Further, such stackable system roles may be dynamic, enabling a best use of the IHSs as the needs of the IHS environment change.

Embodiments of the invention may provide secure methods of applying such roles (i.e., SSRs) to the IHSs using trusted methods to prevent malicious entities from applying inappropriate SSRs. Such secure methods may be efficient and secure to enable quick operation of the IHS environment as desired by the clients.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing information handling systems, the method comprising:
   obtaining, by an information handling system dictator, a stackable system role (SSR) entry from an information handling system (IHS), wherein the SSR entry comprises a SSR and an uncertainty field;
   in response to the obtaining, performing a ratio-based bucket analysis using a set of SSR buckets to obtain a determined SSR for the IHS, wherein each of the SSR buckets corresponds to a unique SSR, wherein performing the ratio-based bucket analysis comprises:
      determining that a SSR bucket of the set of SSR buckets is most similar to the SSR;
      making a determination that the SSR bucket is available for assignment; and
      based on the determination, updating the SSR entry based on the SSR bucket,
      wherein the determined SSR corresponds to the SSR bucket;
   updating the SSR entry based on the determined SSR to obtain an updated SSR entry;
   updating the SSR bucket to specify an updated number of IHSs to which the determined SSR is assigned;
   providing the updated SSR entry to a SSR manager of the information handling system;
   initiating, by the SSR manager of the IHS, a boot sequence;
   making a second determination that the boot sequence specifies the updated SSR entry;
   based on the second determination, performing the boot sequence using the updated SSR entry; and
   implementing, by the IHS and after the boot sequence, computer implemented services in accordance with the determined SSR,
   wherein the SSR uncertainty field is generated based on a ratio between a number of IHSs assigned to the determined SSR and a desired number for the SSR bucket, and
   wherein the updated SSR entry comprises the determined SSR and an updated SSR uncertainty field.

2. The method of claim 1, wherein the SSR entry comprises a worker setting, a storage setting, a manage setting, and an external access setting, wherein the updated SSR entry comprises at least one of: an updated worker setting, an updated storage setting, an updated manage setting, and an updated external access setting.

3. The method of claim 1, wherein the SSR comprises at least one of: a worker setting, a storage setting, a manage setting, and an external access setting.

4. A non-transitory computer readable medium comprising computer readable program code, which when executed by a computer processor enables the computer processor to perform a method for managing information handling systems, the method comprising:
   obtaining, by an information handling system dictator, a stackable system role (SSR) entry from an information handling system (IHS), wherein the SSR entry comprises a SSR and an uncertainty field;
   in response to the obtaining, performing a ratio-based bucket analysis using a set of SSR buckets to obtain a determined SSR for the IHS, wherein each of the SSR buckets corresponds to a unique SSR, wherein performing the ratio-based bucket analysis comprises:
      determining that a SSR bucket of the set of SSR buckets is most similar to the SSR;
      making a determination that the SSR bucket is available for assignment; and
      based on the determination, updating the SSR entry based on the SSR bucket,
      wherein the determined SSR corresponds to the SSR bucket;
   updating the SSR entry based on the determined SSR to obtain an updated SSR entry;
   updating the SSR bucket to specify an updated number of IHSs to which the determined SSR is assigned;
   providing the updated SSR entry to a SSR manager of the information handling system; and
   initiating, by the SSR manager of the IHS, a boot sequence;
   making a second determination that the boot sequence specifies the updated SSR entry;
   based on the second determination, continuing the boot sequence using the updated SSR entry; and
   implementing, by the IHS and after the boot sequence, computer implemented services in accordance with the determined SSR,
   wherein the SSR uncertainty field is generated based on a ratio between a number of IHSs assigned to the determined SSR and a desired number for the SSR bucket, and
   wherein the updated SSR entry comprises the determined SSR and an updated SSR uncertainty field.

5. The non-transitory computer readable medium of claim 4, wherein the SSR comprises at least one of: a worker setting, a storage setting, a manage setting, and an external access setting.

6. The non-transitory computer readable medium of claim 4, wherein the SSR entry comprises a worker setting, a storage setting, a manage setting, and an external access setting, wherein the updated SSR entry comprises at least one of: an updated worker setting, an updated storage setting, an updated manage setting, and an updated external access setting.

7. An information handling system, comprising:
   a processor; and
   memory including instructions, which when executed by the processor, perform a method comprising:
   obtaining a stackable system role (SSR) entry from an information handling system IHS, wherein the SSR entry comprises a SSR and an uncertainty field;
   in response to the obtaining, performing a ratio-based bucket analysis using a set of SSR buckets to obtain a determined SSR for the IHS, wherein each of the SSR buckets corresponds to a unique SSR, wherein performing the ratio-based bucket analysis comprises:
      determining that a SSR bucket of the set of SSR buckets is most similar to the SSR;
      making a determination that the SSR bucket is available for assignment; and
      based on the determination, updating the SSR entry based on the SSR bucket,
      wherein the determined SSR corresponds to the SSR bucket;
   updating the SSR entry based on the determined SSR to obtain an updated SSR entry;
   updating the SSR bucket to specify an updated number of IHSs to which the determined SSR is assigned;
   providing the updated SSR entry to a SSR manager of the information handling system; and
   initiating, by the SSR manager of the IHS, a boot sequence;
   making a second determination that the boot sequence specifies the updated SSR entry;
   based on the second determination, continuing the boot sequence using the updated SSR entry; and
   implementing, by the IHS and after the boot sequence, computer implemented services in accordance with the determined SSR,
   wherein the SSR uncertainty field is generated based on a ratio between a number of IHSs assigned to the determined SSR and a desired number for the SSR bucket, and
   wherein the updated SSR entry comprises the determined SSR and an updated SSR uncertainty field.

8. The information handling system of claim 7, wherein the SSR entry comprises a worker setting, a storage setting, a manage setting, and an external access setting, wherein the updated SSR entry comprises at least one of: an updated worker setting, an updated storage setting, an updated manage setting, and an updated external access setting.

* * * * *